(12) United States Patent
Goh et al.

(10) Patent No.: US 7,879,928 B2
(45) Date of Patent: Feb. 1, 2011

(54) POLYETHER POLYOLS, POLYESTER POLYOLS AND POLYURETHANES OF LOW RESIDUAL ALDEHYDE CONTENT

(75) Inventors: Chin Siong Goh, Singapore (SG); Kerstin Schrinner, Shanghai (CN); Pascal Xanthopoulos, New Rochelle, NY (US)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 83 days.

(21) Appl. No.: 11/918,623

(22) PCT Filed: Apr. 11, 2006

(86) PCT No.: PCT/EP2006/061529
§ 371 (c)(1),
(2), (4) Date: Dec. 11, 2008

(87) PCT Pub. No.: WO2006/111492
PCT Pub. Date: Oct. 26, 2006

(65) Prior Publication Data
US 2009/0182078 A1  Jul. 16, 2009

(30) Foreign Application Priority Data
Apr. 19, 2005 (EP) .................. 05103107

(51) Int. Cl.
*C08K 5/17* (2006.01)
*C08K 5/3412* (2006.01)
*C08K 5/3417* (2006.01)

(52) U.S. Cl. .......... 524/83; 524/243; 524/251; 524/257; 524/258; 524/291

(58) Field of Classification Search ............ 524/111, 524/132, 133, 186, 83, 243, 251, 257, 258, 524/291
See application file for complete search history.

(56) References Cited

U.S. PATENT DOCUMENTS

| 3,429,837 A * | 2/1969 | Langrish et al. ............. 521/172 |
| 3,637,865 A | 1/1972 | Haring .................... 260/611.5 |
| 4,021,385 A | 5/1977 | Austin et al. ................. 260/2.5 |
| 4,094,855 A * | 6/1978 | Spivack ...................... 524/146 |
| 2003/0212170 A1 * | 11/2003 | Tinkl et al. .................. 524/111 |

FOREIGN PATENT DOCUMENTS

EP  0399142  11/1990

OTHER PUBLICATIONS

Hans Zwiefel, Plastics Additives Handbook, 5th Edition, Hanser Publishers, Munich 2001, pp. 88-109.

* cited by examiner

*Primary Examiner*—Kriellion A Sanders
(74) *Attorney, Agent, or Firm*—Tyler A. Stevenson

(57) ABSTRACT

The present invention describes a process for preventing the formation of aldehydic contaminants in polyether polyols, polyester polyols or polyurethanes which comprises incorporating into said polyether polyols, polyester polyols or polyurethanes an effective amount of a) a phenolic antioxidant, b) one or more compounds selected from (i) aminic antioxidants, (ii) benzofuran-2-ones, and (iii) phosphites or phosphonites, or (iv) mixtures thereof.

6 Claims, No Drawings

POLYETHER POLYOLS, POLYESTER POLYOLS AND POLYURETHANES OF LOW RESIDUAL ALDEHYDE CONTENT

The present invention relates to process for preventing the formation of aldehydic contaminants in polyether polyols, polyester polyols or polyurethanes which comprises incorporating into said polyether polyols, polyester polyols or polyurethanes an effective amount of (a) a phenolic antioxidant, and (b) one or more compounds selected from (i) aminic antioxidants, (ii) benzofuran-2-ones, and (iii) phosphites or phosphonites, or (iv) mixtures thereof.

The use of phenolic antioxidants as stabilizers for polyether polyols, polyester polyols or polyurethanes is known, for example, from H. Zweifel; Plastic Additives Handbook, 5th Edition, Hanser Publishers, Munich, pages 88-109 (2001).

The known stabilizers do not satisfy in every respect the high requirements which a stabilizer is required to meet, especially with regard to shelf life, water absorption, sensitivity to hydrolysis, in-process stabilization, color properties, volatility, migration behavior, compatibility and improvement in protection against light. Additionally, there is a strong demand from the automotive industry to significantly reduce of the amount of volatile organic compounds (VOC) and especially gaseous emissions (FOG). The gaseous emissions are also often related to the 'fogging' phenomenon, where evaporated volatile materials may condensate in automobile windscreens leading to deposits on the window. In addition, end-users of bedding, furniture and carpet backing foam are also putting pressure on the manufacturers of flexible slabstock foam. Co-additives such as catalysts, surfactants, flame retardants, antioxidants contribute to emissions of the polyurethane foams. The main sources of VOC are additive like silicone surfactants and amine catalysts. The automotive industry is presently focusing on reducing and/or eliminating emissions related to certain chemicals which are either used as raw materials for the production of plastic automotive parts or are degradation products thereof. Targeted chemicals are for example aldehydes such as for example formaldehyde, acetaldehyde, propionaldehyde; toluene and styrene. We have found that also degradation products from polyether polyols, polyester polyols or polyurethanes can be aldehydes such as for example formaldehyde, acetaldehyde or propionaldehyde.

We have now found that stabilizer mixtures comprising a phenolic antioxidant and a secondary costabilizer show extremely good efficiency in reducing formaldehyde and acetaldehyde levels in polyether polyols and polyurethanes produced thereof.

The present invention relates therefore to a process for preventing the formation of aldehydic contaminants in polyether polyols, polyester polyols or polyurethanes which comprises incorporating into said polyether polyols, polyester polyols or polyurethanes an effective amount of
  a) a phenolic antioxidant,
  b) one or more compounds selected from
    (i) aminic antioxidants,
    (ii) benzofuran-2-ones, and
    (iii) phosphites or phosphonites, or
    (iv) mixtures thereof.

Preferred phenolic antioxidants as component (a) are compounds of the formula I

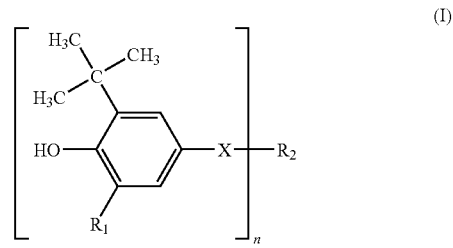

in which
$R_1$ is hydrogen or $C_1$-$C_4$alkyl,
n is 1, 2, 3 or 4,
X is methylene,

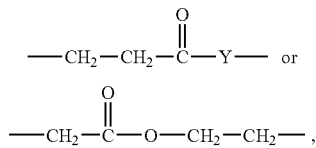

Y is hydrogen or —NH—; and,
if n is 1,
X is

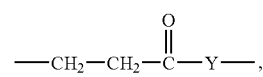

where Y is attached to $R_2$, and
$R_2$ is $C_1$-$C_{25}$alkyl; and,
if n is 2,
X is

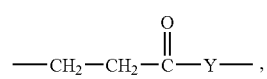

where Y is attached to $R_2$, and
$R_2$ is $C_2$-$C_{12}$alkylene, $C_4$-$C_{12}$alkylene interrupted by oxygen or sulfur; or, if Y is —NH—, $R_2$ is additionally a direct bond; and,
if n is 3,
X is methylene or

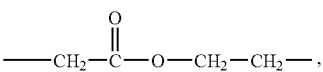

where the ethylene group is attached to $R_2$, and
$R_2$ is

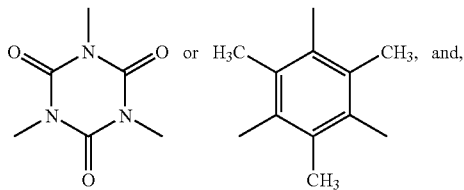

if n is 4,
X is

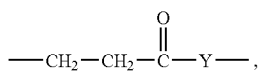

where Y is attached to $R_2$, and
$R_2$ is $C_4$-$C_{10}$alkanetetrayl.

Alkyl having up to 25 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. A preferred definition of $R_1$ is methyl and tert-butyl. A particularly preferred definition of $R_2$ is $C_1$-$C_{20}$alkyl, especially $C_1$-$C_{18}$alkyl, for example $C_4$-$C_{18}$alkyl. An especially preferred definition of $R_2$ is $C_8$-$C_{18}$alkyl, especially $C_{14}$-$C_{18}$alkyl, for example $C_{18}$alkyl.

$C_2$-$C_{12}$alkylene is a branched or unbranched radical, for example ethylene, propylene, tetramethylene, pentamethylene, hexamethylene, heptamethylene, octamethylene, decamethylene or dodecamethylene. A preferred definition of $R_2$ is, for example, $C_2$-$C_{10}$alkylene, especially $C_2$-$C_8$alkylene. An especially preferred definition of $R_2$ is, for example, $C_4$-$C_8$alkylene, especially $C_4$-$C_6$alkylene, for example hexamethylene.

$C_4$-$C_{12}$alkylene interrupted by oxygen or sulfur can be interrupted one or more times and is, for example, —$CH_2$—O—$CH_2CH_2$—O—$CH_2$—, —$CH_2$—(O—$CH_2CH_2$—)$_2$O—$CH_2$—, —$CH_2$—(O—$CH_2CH_2$—)$_3$O—$CH_2$—, —$CH_2$—(O—$CH_2CH_2$—)$_4$O—$CH_2$—, —$CH_2CH_2$—O—$CH_2CH_2$—O—$CH_2CH_2$— or —$CH_2CH_2$—S—$CH_2CH_2$—. A preferred definition of $R_2$ is, for example, $C_4$-$C_{10}$alkylene interrupted by oxygen or sulfur, especially $C_4$-$C_8$alkylene interrupted by oxygen or sulfur, for example $C_4$-$C_6$alkylene interrupted by oxygen or sulfur. An especially preferred meaning of $R_2$ is —$CH_2CH_2$—O—$CH_2CH_2$—O—$CH_2CH_2$— or —$CH_2CH_2$—S—$CH_2CH_2$—.

Alkanetetrayl having 4 to 10 carbon atoms is, for example,

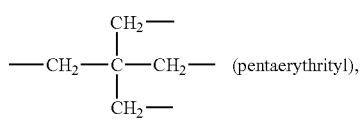

-continued

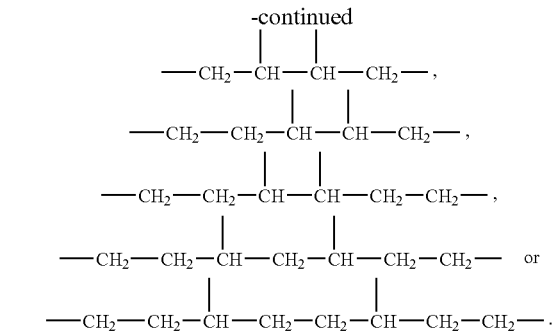

Pentaerythrityl is preferred.

Component (a) may also comprise mixtures of different sterically hindered phenols of the formula I.

A process of interest for preventing the formation of aldehydic contaminants in polyether polyols, polyester polyols or polyurethanes includes phenolic antioxidants as component (a) at least one compound of the formula I in which, if n is 1, $R_2$ is $C_1$-$C_{20}$alkyl.

Preference is given to a process for preventing the formation of aldehydic contaminants in polyether polyols, polyester polyols or polyurethanes comprising as component (a) at least one compound of the formula I in which, if n is 2,
$R_2$ is $C_2$-$C_8$alkylene, $C_4$-$C_8$alkylene interrupted by oxygen or sulfur; or, if Y is —NH—, $R_2$ is additionally a direct bond; and, if n is 3,
X is methylene,
$R_2$ is

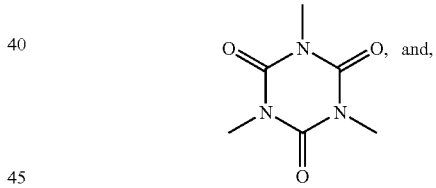

if n is 4,
$R_2$ is $C_4$-$C_8$alkanetetrayl.

Preference is likewise given to a process for preventing the formation of aldehydic contaminants in polyether polyols, polyester polyols or polyurethanes comprising as component (a) at least one compound of the formula I in which $R_1$ is methyl or tert-butyl,
n is 1, 2, 3 or 4,
X is methylene or

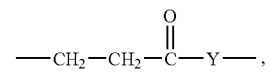

Y is hydrogen or —NH—; and,
if n is 1,
$R_2$ is $C_8$-$C_{18}$alkyl; and,
if n is 2, $R_2$ is $C_4$-$C_6$alkylene, or is $C_4$-$C_6$alkylene interrupted by oxygen; and, if n is 3, X is methylene, $R_2$ is

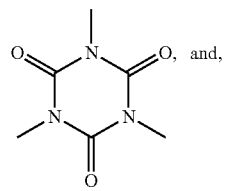

if n is 4, $R_2$ is $C_4$-$C_6$alkanetetrayl.

Of interest is a process for preventing the formation of aldehydic contaminants in polyether polyols, polyester polyols or polyurethanes comprising as component (a) the following phenolic antioxidants:

1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutyl phenol, 2,6-dicyclopentyl-4-methyl phenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethyl phenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methyl phenol), 4,4'-thiobis(3,6-di-sec-amyl phenol), 4,4'-bis(2,6-dimethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methyl phenol, 1,1,3-tris(5-tert-butyl-4-hydroxy-2-methyl phenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methyl phenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecyl mercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethyl benzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenyl propionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl) propionic acid with mono- or poly-hydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenyl propionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

Likewise of interest is a process comprising as component (a) at least one compound of the formula I in which the compound of the formula I is a compound of the formula Ia, Ib or Ic.

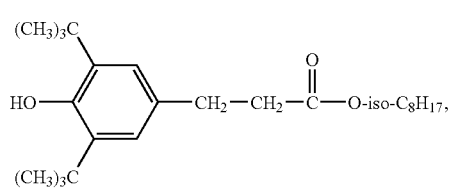

Irganox 1135 (RTM)

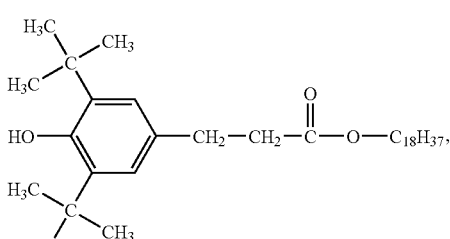

Irganox 1076 (RTM)

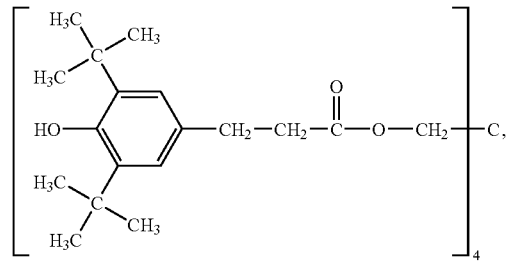

Irganox 1010 (RTM)

Irganox 1135, Irganox 1076 and Irganox 1010 are protected trade names of Ciba Specialty Chemicals Inc.

The compounds of the formula I as component (a) in the novel process, are known and in some cases obtainable commercially. Possible preparation processes for the compounds of the formula I can be found, for example, in the U.S. Pat. No. 3,330,859 or 3,960,928.

Preferred aminic antioxidants as component (b)(i) are compounds of the formula II

wherein $R_{25}$ is $C_1$-$C_{18}$alkyl, phenyl-$C_1$-$C_4$alkyl, $C_5$-$C_{12}$cycloalkyl, phenyl, naphthyl; phenyl or naphthyl each of which is substituted by $C_1$-$C_{12}$alkyl or $C_1$-$C_{12}$alkoxy or benzyl or α,α-dimethylbenzyl, $R_{26}$ is phenyl, naphthyl; phenyl or naphthyl each of which is substituted by $C_1$-$C_{12}$alkyl or $C_1$-$C_{12}$alkoxy or benzyl or α,α-dimethylbenzyl, or $R_{25}$ and $R_{26}$ form a radical of formula III

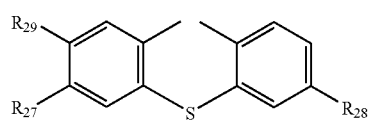

wherein $R_{27}$ and $R_{28}$ are hydrogen or $C_1$-$C_{18}$alkyl, $R_{29}$ is hydrogen, and $R_{27}$ and $R_{29}$, taken together, form a group of formula

A process of interest for preventing the formation of aldehydic contaminants in polyether polyols, polyester polyols or polyurethanes includes aminic antioxidants as component (b)(i) at least a compound of the formula II

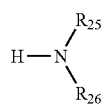

wherein
R$_{25}$ and R$_{26}$ form a radical of formula III

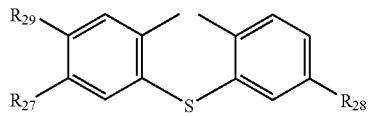

wherein
R$_{27}$ and R$_{28}$ are C$_6$-C$_{12}$alkyl,
R$_{29}$ is hydrogen, or component (b)(i) is a technical mixture obtained by the reaction of diphenylamine with diisobutylene, comprising
α) diphenylamine;
β) 4-tert-butyldiphenylamine;
γ) compounds of the group
  i) 4-tert-octyidiphenylamine,
  ii) 4,4'-di-tert-butyldiphenylamine,
  iii) 2,4,4'-tris-tert-butyldiphenylamine,
δ) compounds of the group
  i) 4-tert-butyl-4'-tert-octyidiphenylamine,
  ii) o,o', m,m', or p,p'-di-tert-octyidiphenylamine,
  iii) 2,4-di-tert-butyl-4'-tert-octyidiphenylamine,
ε) compounds of the group
  i) 4,4'-di-tert-octyidiphenylamine,
  ii) 2,4-di-tert-octyl-4'-tert-butyldiphenylamine, and wherein not more than 5% by weight of component α), 8 to 15% by weight of component β), 24 to 32% by weight of component γ), 23 to 34% by weight of component δ) and 21 to 34% by weight of component ε) are present.

Alkyl substituents may contain up to 18 carbon atoms. Typical examples of such substituents are methyl, ethyl, propyl, butyl, pentyl, hexyl, heptyl, octyl, nonyl, decyl, undecyl, dodecyl, tetradecyl, hexadecyl or octadecyl and corresponding branched isomers, preferably, tert-butyl, i-octyl and i-dodecyl.

A process of special interest for preventing the formation of aldehydic contaminants in polyether polyols, polyester polyols or polyurethanes includes the following aminic antioxidants as component (b)(i):

Of interest is a process for preventing the formation of aldehydic contaminants in polyether polyols, polyester polyols or polyurethanes comprising as component (b)(i) the following aminic antioxidants:

N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyidiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenyl methane, 1,2-bis[(2-methyl phenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyidiphenylamines, a mixture of mono- and dialkylated nonyidiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

The above mentioned aminic antioxidants are known compounds; many of them are available commercially.

The following compounds are examples of benzofuran-2-one stabilizers that are especially suitable as component (b)(ii) in the process according to the invention: 3-[4-(2-acetoxyethoxy)phenyl]-5,7-di-tert-butyl-benzofuran-2-one; 5,7-di-tert-butyl-3-[4-(2-stearoyloxyethoxy)-phenyl]-benzofuran-2-one; 3,3'-bis[5,7-di-tert-butyl-3-(4-[2-hydroxyethoxy]phenyl)-benzofuran-2-one]; 5,7-di-tert-butyl-3-(4-ethoxyphenyl)benzofuran-2-one; 3-(4-acetoxy-3,5-dimethyl-phenyl)-5,7-di-tert-butyl-benzofuran-2-one; 3-(3,5-dimethyl-4-pivaloyloxyphenyl)-5,7-di-tert-butyl-benzofuran-2-one; 5,7-di-tert-butyl-3-phenyl-benzofuran-2-one; 5,7-di-tert-butyl-3-(3,4-dimethylphenyl)-benzofuran-2-one; 5,7-di-tert-butyl-3-(2,3-dimethylphenyl)-benzofuran-2-one or 5-tert-octyl-3-(2-acetyl-5-tert-octylphenyl)-benzofuran-2-one.

A process of interest for preventing the formation of aldehydic contaminants in polyether polyols, polyester polyols or polyurethanes includes benzofuran-2-one stabilizers as component (b)(ii) at least a compound of the formula IV

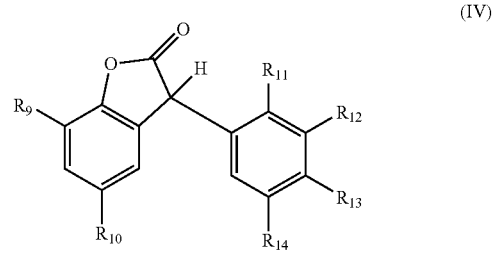

wherein
R$_9$ is hydrogen or C$_1$-C$_8$alkyl,
R$_{10}$ is C$_1$-C$_{12}$alkyl,
R$_{11}$ is hydrogen, C$_1$-C$_4$alkyl or C$_2$-C$_8$alkanoyl,
R$_{12}$ is hydrogen or C$_1$-C$_8$alkyl,
R$_{13}$ is hydrogen, C$_1$-C$_4$alkyl or C$_1$-C$_4$alkoxy, and
R$_{14}$ is hydrogen or C$_1$-C$_{12}$alkyl.

$C_2$-$C_8$alkanoyl is for example acetyl, propionyl, butanoyl, pentanoyl, hexanoyl, heptanoyl or octanoyl. Acetyl is preferred.

Especially preferred benzofuran-2-one stabilizers are for example 5,7-di-tert-butyl-3-phenyl-benzofuran-2-one; 5,7-di-tert-butyl-3-(3,4-dimethylphenyl)-benzofuran-2-one; 5,7-di-tert-butyl-3-(2,3-dimethylphenyl)-benzofuran-2-one or 5-tert-octyl-3-(2-acetyl-5-tert-octylphenyl)-benzofuran-2-one.

The benzofuran-2-one stabilizers of the formula IV are known in the literature and disclosed for example in U.S. Pat. No. 5,516,920.

A process of interest for preventing the formation of aldehydic contaminants in polyether polyols, polyester polyols or polyurethanes includes phosphites or phosphonites as component (b)(iii) at least a compound of the formula V, VI, VII or VIII

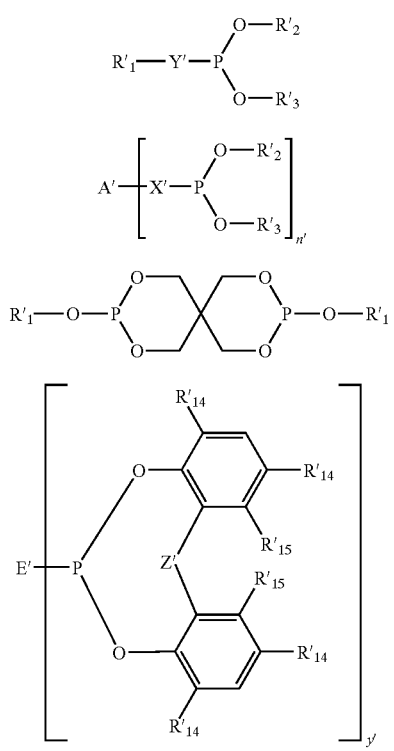

in which
n' is the number 2 and y' is the number 1, 2 or 3;
A' is $C_2$-$C_{18}$alkylene, p-phenylene or p-biphenylene,
E', if y' is 1, is $C_1$-$C_{18}$alkyl, —OR'$_1$ or fluorine;
E', if y' is 2, is p-biphenylene,
E', if y' is 3, is $N(CH_2CH_2O—)_3$,
R'$_1$, R'$_2$ and R'$_3$ independently of one another are $C_1$-$C_{18}$alkyl, $C_7$-$C_9$phenylalkyl, cyclohexyl, phenyl, or phenyl substituted by 1 to 3 alkyl radicals having in total 1 to 18 carbon atoms;
R'$_{14}$ is hydrogen or $C_1$-$C_9$alkyl,
R'$_{15}$ is hydrogen or methyl;
X' is a direct bond,
Y' is oxygen,
Z' is a direct bond or —CH(R'$_{16}$)—, and
R'$_{16}$ is $C_1$-$C_4$alkyl.

Likewise of interest is a process for preventing the formation of aldehydic contaminants in polyether polyols, polyester polyols or polyurethanes comprising as component (b)(iii) at least a phosphite or phosphonite of the formula V, VI, VII or VIII, in which
n' is the number 2 and y' is the number 1 or 3;
A' is p-biphenylene,
E', if y' is 1, is $C_1$-$C_{18}$alkoxy or fluorine,
E', if y' is 3, is $N(CH_2CH_2O—)_3$,
R'$_1$, R'$_2$ and R'$_3$ independently of one another are $C_1$-$C_{18}$alkyl, or are phenyl substituted by 2 or 3 alkyl radicals having in total 2 to 12 carbon atoms;
R'$_{14}$ is methyl or tert-butyl;
R'$_{15}$ is hydrogen;
X' is a direct bond;
Y' is oxygen; and
Z' is a direct bond, methylene or —CH(CH$_3$)—.

Special preference is given to a process for preventing the formation of aldehydic contaminants in polyether polyols, polyester polyols or polyurethanes comprising as component (b)(iii) at least a phosphite of the formula IX

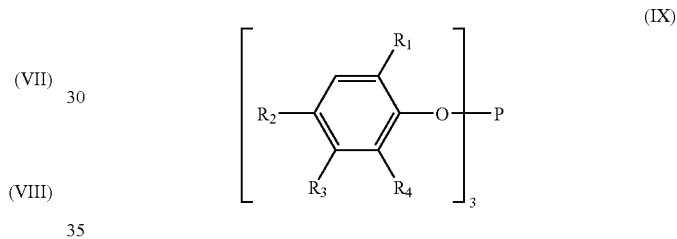

in which
R$_1$ and R$_2$ independently of one another are hydrogen, $C_1$-$C_8$alkyl, cyclohexyl or phenyl, and R$_3$ and R$_4$ independently of one another are hydrogen or $C_1$-$C_4$alkyl.

The following compounds are examples of organic phosphites and phosphonites which are particularly suitable as component (b)(iii) in the novel process.

Triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite (Irgafos® 168, Ciba Specialty Chemicals Inc.), diisodecyl pentaerythritol diphosphite, bis(2,4-di-tert-butylphenyl) pentaerythritol diphosphite (formula D), bis(2,6-di-tert-butyl-4-methylphenyl) pentaerythritol diphosphite (formula E), bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite (Irgafos®P-EPQ, Ciba Specialty Chemicals Inc., formula H), 6-isooctyloxy-2,4,8,10-tetra-tert-butyl-12H-dibenzo[d,g]-1,3,2-dioxaphosphocin (formula C), 6-fluoro-2,4,8,10-tetra-tert-butyl-12-methyldibenzo[d,g]-1,3,2-dioxaphosphocin (formula A), bis(2,4-di-tert-butyl-6-methylphenyl)methyl phosphite, bis(2,4-di-tert-butyl-6-methylphenyl)ethyl phosphite (formula G).

Particular preference is given to the following phosphites and phosphonites:
tris(2,4-di-tert-butylphenyl) phosphite (Irgafos®168, Ciba Specialty Chemicals Inc.), tris(nonylphenyl) phosphite, (A) 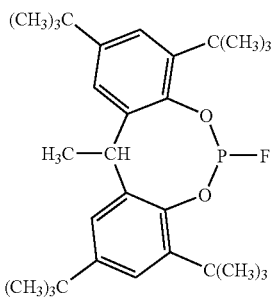

(B) 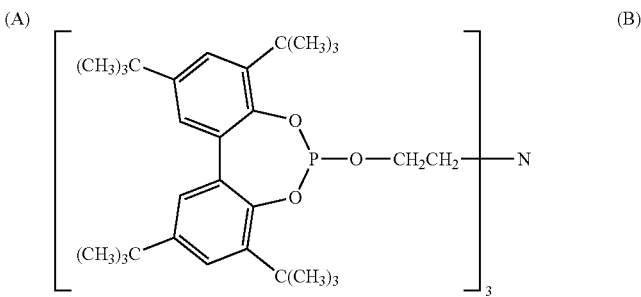

(C) 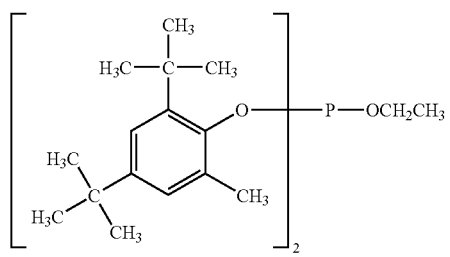

(D) 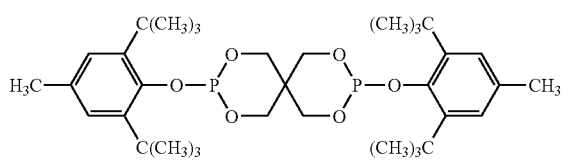

(E) 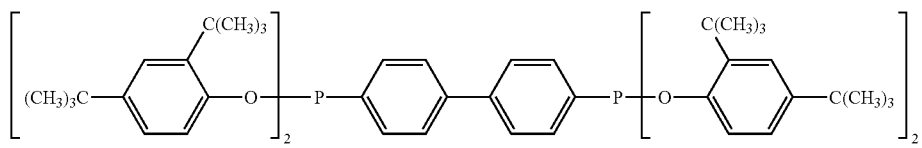

(F) 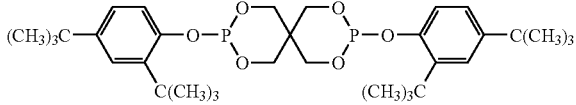

(G) 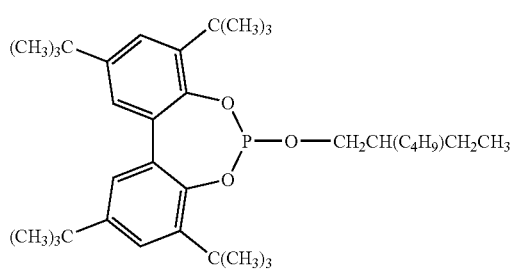

(H) 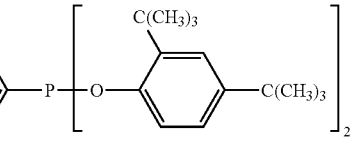

Very particular preference is given to tris(2,4-di-tert-butylphenyl) phosphite [Irgafos®168, Ciba Specialty Chemicals Inc.], bis(2,4-di-tert-butyl-6-methylphenyl)ethyl phosphite [Irgafos® 38, Ciba Specialty Chemicals Inc., formula (G)], bis(2,4-di-tert-butylphenyl) pentaerythritol diphosphite [Irgafos®126, Ciba Specialty Chemicals Inc., formula (D)] or tetrakis(2,4-di-tert-butylphenyl)-4,4'-biphenylenediphosphonite [Irgafos®P-EPQ, Ciba Specialty Chemicals Inc., formula (H)].

The above mentioned organic phosphites and phosphonites are known compounds; many of them are available commercially.

The components (a) and (b) are likewise used for polyurethane production, especially for preparing flexible polyurethane foams. In this context the novel products produced therefrom are effectively protected against degradation and possess a low amount of aldehyde contaminants. In particular, also scorching during foam production is avoided. Preferably, phosphites such as for example diphenyl isodecyl phosphite (DPDP) or phenyl diisodecyl phosphite (PDDP) are post added as antioxidants or antiscorch systems to the base stabilized polyether polyols at the mixing head prior to the foaming in relative high concentrations (up to 1.5% by weight based on the polyether polyol).

The polyurethanes are obtained, for example, by reacting polyethers, polyesters and polybutadienes which contain terminal hydroxyl groups with aliphatic or aromatic polyisocyanates.

Polyethers and polyesters having terminal hydroxyl groups are known and are prepared, for example, by polymerizing epoxides such as ethylene oxide, propylene oxide, butylene oxide, tetrahydrofuran, styrene oxide or epichlorohydrin with themselves, for example in the presence of BF$_3$, or by addition reaction of these epoxides, alone or as a mixture or in succession, with starting components containing reactive hydrogen atoms, such as water, alcohols, ammonia or amines, for example ethylene glycol, propylene 1,3- and 1,2-glycol, trimethylolpropane, 4,4'-dihydroxydiphenylpropane, aniline, ethanolamine or ethylenediamine. Sucrose polyethers are also suitable in accordance with the invention. In many cases preference is given to those polyethers which predominantly (up to 90% by weight, based on all the OH groups present in the polyether) contain primary OH groups. Furthermore, polyethers modified by vinyl polymers, as are formed, for example, by polymerizing styrene and acrylonitrile in the presence of polyethers, are suitable, as are polybutadienes containing OH groups.

These compounds generally have molecular weights of 40 and are polyhydroxy compounds, especially compounds containing from two to eight hydroxyl groups, especially those of molecular weight from 800 to 10 000, preferably from 1000 to 6000, for example polyethers containing at least 2, generally 2 to 8, but preferably 2 to 4, hydroxyl groups, as are known for the preparation of homogeneous polyurethanes and cellular polyurethanes.

It is of course possible to employ mixtures of the above compounds containing at least two isocyanate-reactive hydrogen atoms, in particular with a molecular weight of 400-10 000.

Suitable polyisocyanates are aliphatic, cycloaliphatic, araliphatic, aromatic and heterocyclic polyisocyanates, for example ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and -1,4-diisocyanate and also any desired mixtures of these isomers, 1-isocyanato-3,3,5-trimethyl-5-isocyanatomethylcyclohexane, 2,4- and 2,6-hexahydrotolylene diisocyanate and also any desired mixtures of these isomers, hexahydro-1,3- and/or -1,4-phenylene diisocyanate, perhydro-2,4'- and/or -4,4'-diphenylmethanediisocyanate, 1,3- and 1,4-phenylene diisocyanate, 2,4- and 2,6-tolylene diisocyanate, and also any desired mixtures of these isomers, diphenylmethane 2,4'- and/or -4,4'-diisocyanate, naphthylene 1,5-diisocyanate, triphenylmethane 4,4',4"-triisocyanate, polyphenyl-polymethylene polyisocyanates as are obtained by aniline-formaldehyde condensation followed by phosgenization, m- and p-isocyanatophenylsulfonyl isocyanates, perchlorinated aryl polyisocyanates, polyisocyanates containing carbodiimide groups, polyisocyanates containing allophanate groups, polyisocyanates containing isocyanurate groups, polyisocyanates containing urethane groups, polyisocyanates containing acylated urea groups, polyisocyanates containing biuret groups, polyisocyanates containing ester groups, reaction products of the abovementioned isocyanates with acetals, and polyisocyanates containing polymeric fatty acid radicals.

It is also possible to employ the isocyanate group-containing distillation residues as they are or dissolved in one or more of the abovementioned polyisocyanates, which are obtained in the course of the industrial preparation of isocyanates. It is additionally possible to use any desired mixtures of the abovementioned polyisocyanates.

Particular preference is given in general to the polyisocyanates which are readily obtainable industrially, for example 2,4- and 2,6-tolylene diisocyanate and any desired mixtures of these isomers ("TDI"), polyphenyl-polymethylene-polyisocyanates as prepared by aniline-formaldehyde condensation followed by phosgenization ("crude MDI"), and polyisocyanates containing carbodiimide, urethane, allophanate, isocyanurate, urea or biuret groups ("modified polyisocyanates").

Polyurethane foams are preferably prepared from liquid starting components, either the starting materials to be reacted with one another being mixed together in a one-shot process, or a preadduct containing NCO groups that are formed from a polyol and an excess of polyisocyanate being prepared first and the foamed, typically by reaction with water.

In the preparation of foams, the foaming is often carried out in moulds. In that case, the reaction mixture is placed in a mould. Suitable mould materials are metals, typically aluminium, or plastics, typically epoxy resins. In the mould, the foamable reaction mixture foams up and forms the moulded article. The foam moulding can be carried out such that the moulding has a cellular surface structure or, alternatively, such that the moulding has a dense skin and a cellular core. In this connection, it is possible to place into the mould a sufficient amount of foamable reaction mixture for the foam obtained to fill the mould exactly. It is, however, also possible to place more foamable reaction mixture into the mould than is required to fill the interior of the mould with foam. In the latter case, therefore, the operation is carried out with overcharging.

In the case of foam moulding, known external release agents, typically silicone oils, are often used concomitantly. It is, however, also possible to use so-called internal release agents, optionally in admixture with external release agents. It is also possible to use cold-curing foams. The foams can, of course, alternatively be prepared by block foaming or by the known double conveyor belt process. These processes can be used to prepare flexible, semi-flexible or hard polyurethane foams. The foams find the utilities known for such products, for example as mattresses and upholstery in the furniture and automobile industries, as well as for the manufacture of fittings, such as are used in the automobile industry, and finally as sound-insulating compositions and as compositions for heat-insulation and low-temperature insulation, for example in the construction sector or in the refrigeration industry, or in the textile industry, for example as shoulder pads.

Component (a) is preferably added to the polyether polyols, polyester polyols or polyurethanes to be stabilized in an amount of from 0.01 to 10%, in particular from 0.01 to 5%, for example from 0.01 to 2%, based on the weight of the polyether polyols, polyester polyols or polyurethanes to be stabilized.

Component (b) is preferably added to the polyether polyols, polyester polyols or polyurethanes to be stabilized in an amount of from 0.01 to 10%, in particular from 0.01 to 5%, for example from 0.01 to 2%, based on the weight of the polyether polyols, polyester polyols or polyurethanes to be stabilized.

In addition to components (a) and (b) the novel process for preventing the formation of aldehydic contaminants in polyether polyols, polyester polyols or polyurethanes may comprise further costabilizers (additives) such as, for example, the following:

1. Ascorbic acid (vitamin C)
2. UV absorbers and light stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'- sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenyl benzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-yl phenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butyl phenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5] decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2, 4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenyl propionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Hydroxylamines, for example N,N-dibenzyl hydroxylamine, N,N-diethyl hydroxylamine, N,N-dioctylhydroxylamine, N,N-dilaurylhydroxylamine, N,N-ditetradecyl hydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

5. Nitrones, for example, N-benzyl-alpha-phenylnitrone, N-ethyl-alpha-methylnitrone, N-octyl-alpha-heptyl nitrone, N-lauryl-alpha-undecylnitrone, N-tetradecyl-alpha-tridecylnnitrone, N-hexadecyl-alpha-pentadecyl nitrone, N-octadecyl-alpha-heptadecyl nitrone, N-hexadecyl-alpha-heptadecyl nitrone, N-ocatadecyl-alpha-pentadecyl nitrone, N-heptadecyl-alpha-heptadecylnitrone, N-octadecyl-alpha-hexadecyl nitrone, nitrone derived from N N-dialkylhydroxylamine derived from hydrogenated tallow amine.

6. Thiosynergists, for example dilauryl thiodipropionate, dimistryl thiodipropionate, distearyl thiodipropionate or distearyl disulfide.

7. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

8. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

9. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

10. Other additives, for example plasticisers, lubricants, emulsifiers, pigments, rheology additives, catalysts, flow-control agents, optical brighteners, flameproofing agents, antistatic agents and blowing agents.

The costabilizers are added, for example, in concentrations of 0.01 to 10%, relative to the total weight of the polyether polyols, polyester polyols or polyurethanes to be stabilized.

Preferred further additives are light-stabilizers (item 2 of the list).

A preferred subject of the present invention is also the use a mixture of components (a) and (b) for preventing the formation of aldehydic contaminants of polyether polyols, polyester polyols or polyurethanes.

The examples which follow illustrate the invention in more detail. Parts and percentages are by weight.

EXAMPLE 1

Stabilization of Polyether Polyol

The stabilizer mixture as indicated in Table 1 is dissolved in 160 g of a polyether polyol [Petol 46-3 MB® (trifunctional polyether polyol having primary hydroxyl groups; hydroxyl number 48 mg KOH/g, water content less than 0.1%, acid number less than 0.1 mg KOH/g)] in an amount as indicated in Table 1. The polyether polyol is stored in an oven at 80° C. for several days. The formed amount of formaldehyde, acetaldehyde and propionaldehyde is measured by taking out samples periodically. These samples were treated with a dinitrophenyl hydrazine-acetonitrile solution (DNPH-acetonitrile solution). The formed formaldehyde-DNPH, acetaldehyde-DNPH and propionaldehyde-DNPH is measured quantitatively by a HPLC method using a Alltima C18 5 μm column [4.6×250 mm] at a column temperature of 30° C. and a mobile phase containing 60% acetonitrile and 40% water. The solvent flow is 1.2 ml/minute. The results are summarized in Tables 1 and 2.

TABLE 1

| Example | Stabilizer | Formaldehyde (ppm) after days | | | Acetaldehyde (ppm) after days | | | Propionaldehyde (ppm) after days | | |
|---|---|---|---|---|---|---|---|---|---|---|
| | | 0 | 2 | 5 | 0 | 2 | 5 | 0 | 2 | 5 |
| 1a[a] | none | 1.2 | 6.8 | 18 | 3.6 | 24 | 99 | 2.8 | 4.1 | 11 |
| 1b[a] | 0.1% Irganox 1135[c] | 1.6 | 2.5 | 5.4 | 3.7 | 6.6 | 13 | 2.7 | 2.6 | 2.5 |
| 1c[b] | 0.1% Mixture 1[d] | 1.4 | 1.7 | 1.8 | 3.6 | 4.3 | 4.6 | 2.7 | 2.5 | 2.5 |
| 1d[b] | 0.1% Mixture 2[e] | 1.2 | 2.4 | 4.6 | 3.4 | 5.6 | 11 | 2.7 | 2.6 | 2.5 |
| 1e[b] | 0.1% Mixture 3[f] | 1.4 | 2.3 | 2.7 | 3.9 | 5.6 | 6.3 | 2.7 | 2.4 | 2.4 |
| 1f[b] | 0.1% Mixture 4[g] | 1.4 | 2.9 | 7.2 | 3.4 | 6.5 | 17 | 2.6 | 2.5 | 2.4 |

TABLE 2

| Exampe | Stabilizer | Formaldehyde (ppm) after days | | Acetaldehyde (ppm) after days | |
|---|---|---|---|---|---|
| | | 0 | 15 | 0 | 15 |
| 1g[a)] | none | 0.3 | 20 | 1.7 | 84 |
| 1h[b)] | 0.1% Mixture 1[d)] | 0.3 | 1.0 | 1.8 | 3.1 |
| 1i[b)] | 0.1 % Mixture 3[f)] | 0.4 | 1.7 | 1.9 | 5.2 |

[a)]Comparison example.

[b)]Example according to the invention.

[c)]Irganox 1135 (RTM) (Ciba Specialty Chemicals Inc.) is a phenolic antioxidant of the formula AO-1.

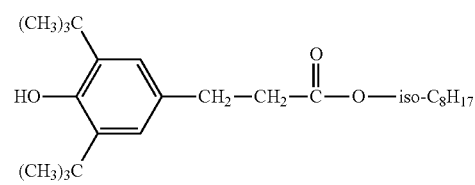
(AO-1)

[d)]Mixture 1 is a mixture of 2 parts of Irganox 1135[c)] and 1 part of Irganox 5057[h)].

[e)]Mixture 2 is a mixture of 7 parts of Irganox 1135[c)], 1 part of Irgafos 38[i)] and 1 part of Irganox HP 136[j)].

[f)]Mixture 3 is a mixture of 10 parts of Irganox 1135[c)], 3 parts of Irganox 5057[h)] and 1 part of PS-1[k)].

[g)]Mixture 4 is a mixture of 7 parts of Irganox 1135[c)], 1 part of Irgafos 38[i)] and 1 part of PS-1[k)].

[h)]Irganox 5057 (RTM) (Ciba Specialty Chemicals Inc.) is an aminic antioxidant and is a technical mixture obtained by the reaction of diphenylamine with diisobutylene, comprising α) diphenylamine;

β) 4-tert-butyldiphenylamine;

γ) compounds of the group i) 4-tert-octyldiphenylamine, ii) 4,4'-di-tert-butyldiphenylamine, iii) 2,4,4'-tris-tert-butyldiphenylamine, δ) compounds of the group i) 4-tert-butyl-4'-tert-octyldiphenylamine, ii) o,o', m,m', or p,p'-di-tert-octyldiphenylamine, iii) 2,4-di-tert-butyl-4'-tert-octyldiphenylamine, ε) compounds of the group i) 4,4'-di-tert-octyldiphenylamine, ii) 2,4-di-tert-octyl-4'-tert-butyldiphenylamine, and wherein not more than 5 % by weight of component α), 8 to 15 % by weight of component β), 24 to 32 % by weight of component γ), 23 to 34 % by weight of component δ) and 21 to 34 % by weight of component ε) are present.

[i)]Irgafos 38 (RTM) (Ciba Specialty Chemicals Inc.) is bis(2,4-di-tert-butyl-6-methylphenyl)-ethyl phosphite.

[j)]Irganox HP 136 (RTM) (Ciba Specialty Chemicals Inc.) is is a mixture of about 85 parts by weight of the compound of the formula IVa and about 15 parts by weight of the compound of the formula IVb.

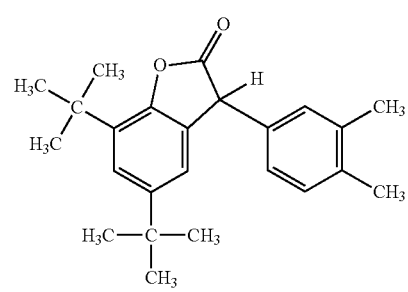
(IVa)

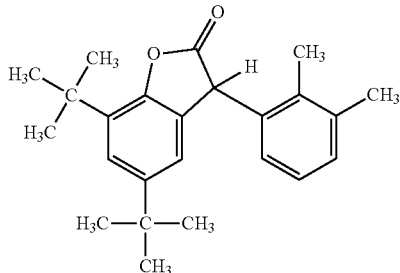
(IVb)

[k)]PS-1 is 3-(2-actyl-5-isooctylphenyl)-5-isooctylbenzofuran-2-one of the formula IVc.

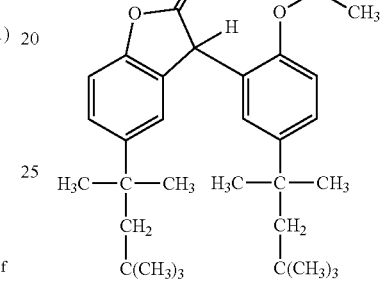
(IVc)

What is claimed is:

1. A process for preventing the formation of aldehydic contaminants in polyether polyols, polyester polyols or polyurethanes which comprises incorporating into said polyether polyols, polyester polyols or polyurethanes an effective amount of
   (a) a phenolic antioxidant, and
   (b) an aminic antioxidant,
   where the phenolic antioxidant is

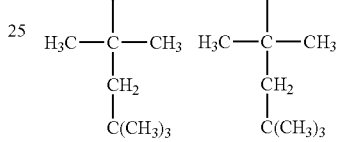

and
where the aminic antioxidant is of formula (II)

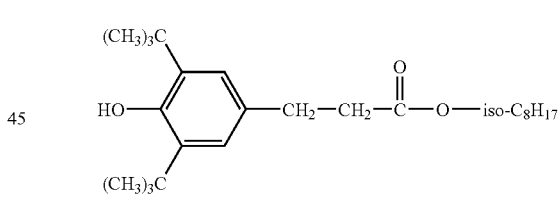
(II)

wherein
   $R_{25}$ is $C_1$-$C_{18}$alkyl, phenyl-$C_1$-$C_4$alkyl, $C_5$-$C_{12}$cycloalkyl, phenyl or naphthyl; or is phenyl or naphthyl each of which is substituted by $C_1$-$C_{12}$alkyl, $C_1$-$C_{12}$alkoxy, benzyl or α,α-dimethylbenzyl and
   $R_{26}$ is phenyl or naphthyl; or is phenyl or naphthyl each of which is substituted by $C_1$-$C_{12}$alkoxy, benzyl or α,α-dimethylbenzyl, or $R_{25}$ and $R_{26}$ form a radical of formula III

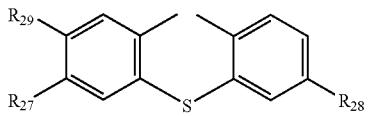
(III)

wherein
$R_{27}$ and $R_{28}$ are hydrogen or $C_1$-$C_{18}$alkyl and
$R_{29}$ is hydrogen or
$R_{27}$ and $R_{29}$, taken together, form a group of formula

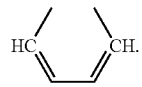

2. A process according to claim 1, wherein component (a) is present in an amount of 0.01 to 10% based on the weight of the polyether polyols, polyester polyols or polyurethanes.

3. A process according to claim 1, wherein component (b) is present in an amount of 0.01 to 10% based on the weight of the polyether polyols, polyester polyols or polyurethanes.

4. A process according to claim 1, comprising in addition, besides components (a) and (b), further additives.

5. A process according to claim 4, comprising as further additives light-stabilizers.

6. A process according to claim 1, where component (b) is a mixture obtained by the reaction of diphenylamine with diisobutylene.

* * * * *